Oct. 4, 1966    A. A. SACKLER ET AL    3,276,788
CASTERING MECHANISM

Filed July 13, 1964    3 Sheets-Sheet 1

INVENTORS
RAYMOND J. ENYEART
ALBERT A. SACKLER
BY SAMUEL G. TAYLOR

Kraguiski & Nolan
ATTORNEYS

Oct. 4, 1966 A. A. SACKLER ETAL 3,276,788
CASTERING MECHANISM
Filed July 13, 1964 3 Sheets-Sheet 2

INVENTORS
RAYMOND J. ENYEART
ALBERT A. SACKLER
BY SAMUEL G. TAYLOR
Krazinski & Nolan
ATTORNEYS

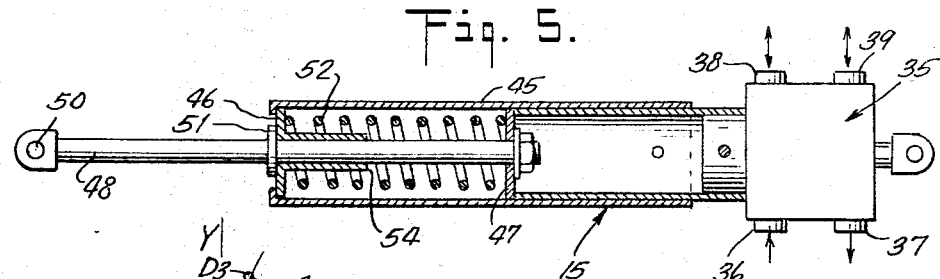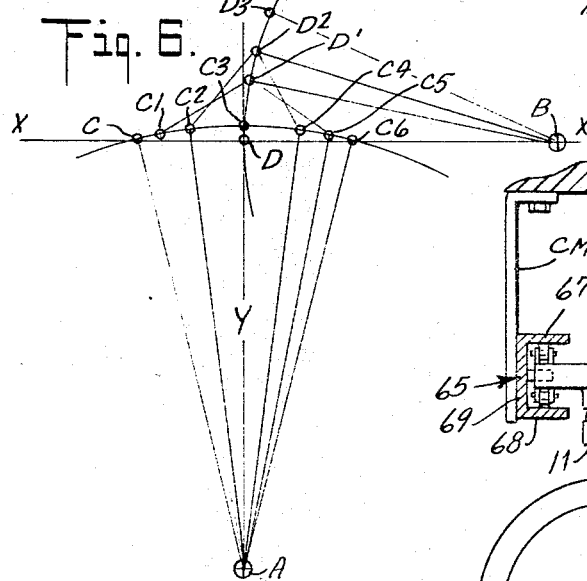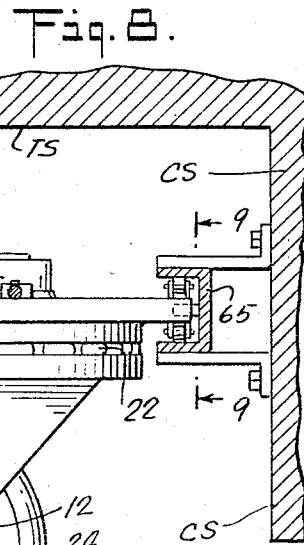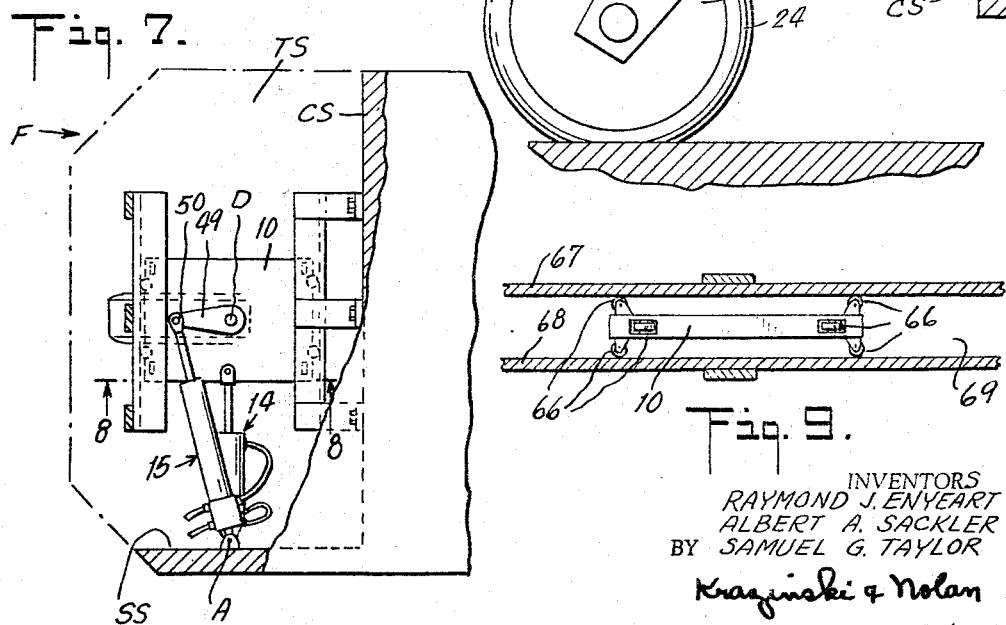

United States Patent Office 3,276,788
Patented Oct. 4, 1966

3,276,788
CASTERING MECHANISM
Albert A. Sackler and Raymond J. Enyeart, Westport, and Samuel G. Taylor, Darien, Conn., assignors to Consolidated Diesel Electric Corporation, Stamford, Conn., a corporation of New York
Filed July 13, 1964, Ser. No. 382,196
7 Claims. (Cl. 280—80)

The present invention relates to vehicles such as tractors and tow tucks which are supported on drive wheels and at least one caster wheel and, more particularly, to an improved castering mechanism for such caster wheels.

In most applications, a commonly available free swivelling caster is perfectly satisfactory for such vehicles, but in certain instances it has a distinct disadvantage. If it is desired to reverse the direction of movement of the vehicle without lateral shift of the vehicle, the conventional caster with its inherent caster offset cannot be used. This is because of the fact that, as the caster wheel comes around to its trailing position upon reversal of the direction of movement of the vehicle, the caster wheel imposes substatial lateral forces on the vehicle, thereby causing the vehicle to momentarily shift laterally the distance of the caster offset before the vehicle returns to the desired line of travel. This is particularly disadvantageous in connection with large, heavily loaded, pneumatic tired casters having large caster offsets.

Accordingly, an object of the present invention is to provide castering mechanism which eliminates the foregoing disadvantages.

Another object is to provide such castering mechanism which allows the caster wheel to properly assume its trailing position while eliminating the undesirable effects of lateral vehicle shift.

Another object is to provide such castering mechanism wherein the effective caster wheel offset is reduced to zero.

A further object is to provide such castering mechanism which is simple, practical, durable and economical in construction, and is reliable in operation even when applied to extremely heavily loaded casters.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by shifting an upper caster plate with respect to the vehicle as the caster wheel comes around to assume its trailing position in such a manner that the center of the caster wheel tire contact with the ground remains constantly in an essentially fixed lateral location with respect to the vehicle.

In the drawings:

FIG. 5 is an enlarged view partly in section and partly in elevation illustrating a servo-link of the castering mechanism in detail.

FIG. 6 is a motion diagram illustrating the location of various pivot points during the operation of the castering mechanism.

FIG. 7 is a view similar to FIG. 3 illustrating another embodiment of the present invention.

FIG. 8 is an enlarged sectional view taken along the line 8—8 on FIG. 7.

FIG. 9 is a sectional view taken along the line 9—9 on FIG. 8.

Figure 1:
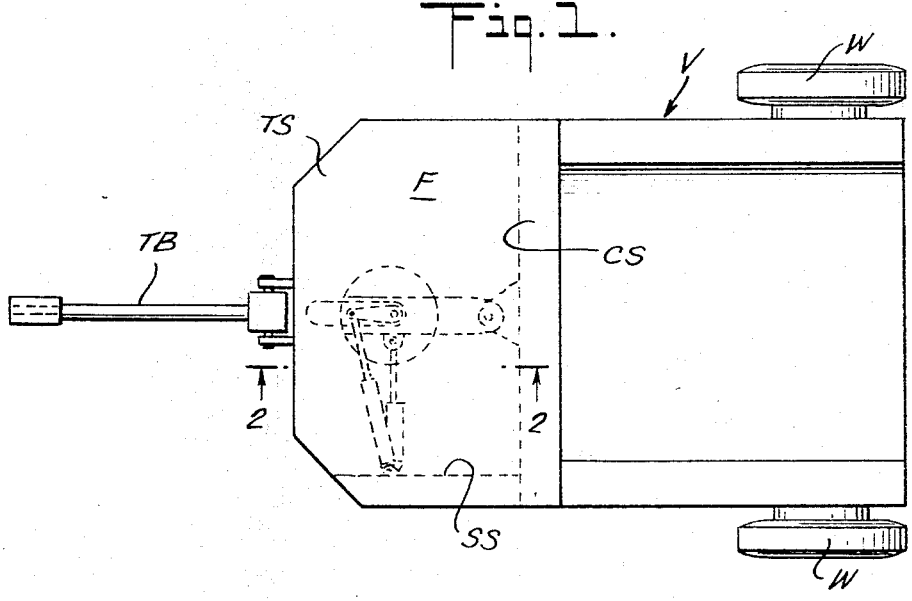
FIG. 1 is a plan view of a vehicle equipped with castering mechanism in accordance with the present invention.

Referring now to FIGS. 1 to 4 of the drawings in detail, there is shown a vehicle V having a frame F at one end provided with top, side and crosswise structure TS, SS and CS, respectively, for mounting the castering mechanism, and having a tow bar TB connected to the end of the frame and drive wheels W (FIG. 1).

The castering mechanism illustrated in FIGS. 1 to 4 generally comprises an upper caster plate 10, a lower caster plate 11 journalled for rotation with respect to the upper plate, a caster wheel 12 mounted on the lower plate, motor means 14 for effecting lateral movement of the upper plate, and means 15 for controlling the operation of the motor means in response to rotary movement of the lower plate.

Figure 2:
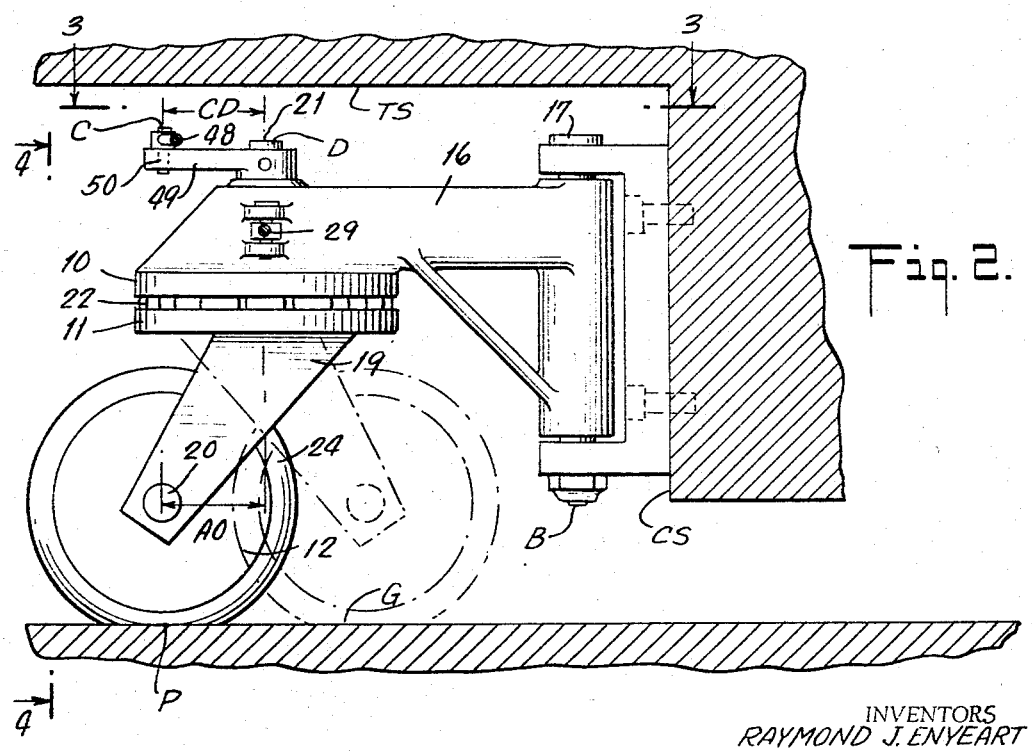
FIG. 2 is an enlarged sectional view taken along the line 2—2 on FIG. 1 illustrating the castering mechanism in elevation.

The upper plate 10 has one end of an arm 16 integrally formed therewith, and a ring-bolt arrangement 17 at B pivotally supports the other end of the arm on the crosswise frame structure CS of the vehicle so that the arm extends aftwise of the vehicle (FIGS. 1 and 2). The upper plate 10 also has a central bearing 18 extending vertically therethrough for the purpose about to be described.

The lower plate 11 has a depending aftwise slanted depending fork 19 for mounting the wheel 12 therebetween on a horizontal axle 20, and has a vertical shaft 21 secured thereon journalled for rotation in the bearing 18 and extending upwardly through the upper plate bearing. The axis of rotation of the shaft 21 is designated as point D. Suitable thrust bearing arrangement 22 rotatably supports the upper plate 10 on the lower plate 11. As shown in FIG. 2, the axis of the axle 20 is offset a horital distance AO from the axis of the shaft 21. The wheel 12 has conventional tire 24 mounted thereon having a center point P of contact with the ground G (FIG. 2).

The castering mechanism, so far described, is similar to a free swivelling arrangement which is provided with additional mechanism in accordance with the present invention as about to be described.

The motor means 14 (FIGS. 3 and 4) include a cylinder 25 having hydraulic fluid inlet and outlet ports 26 and 27 at opposite ends thereof, a piston 28 in the cylinder 25, and a piston rod 29 connected to the piston 28 and extending outwardly of the cylinder 25. The cylinder 25 is pivotally connected by a pin 31 to a lug 30 on the vehicle frame structure SS at the point A and the free end of the piston rod 29 is pivotally connected to a lug 32 on the upper plate 10 by a pin 34. In this manner, the motor means 14 can move the upper plate in lateral directions with respect to the vehicle.

The means 15 for controlling the operation of the motor means 14, for example, is a servo-link (FIGS. 3 to 5) which generally comprises a conventional servo-valve 35 (FIG. 5) having inlet and outlet ports 36 and 37 for connection to a source of hydraulic fluid under pressure (not shown) and having ports 38 and 39 respectively connected to the ports 26 and 27 of the motor by flexible conduits 40 and 41; a cylinder 45 having an end wall 46; a piston 47 slidably mounted in the cylinder 45; a piston rod 48 extending through an opening in the end wall 46 having one end pivotally connected to a lever 49 (FIG. 3) secured to the upper end of and movable with the shaft 21 by a pin 50, having its other end connected to the piston 47 for moving the piston from right to left, as viewed in FIG. 5, and having a stop 51 for engaging the exterior of the end wall 46; and a double action spring 52 in the cylinder 45 biased between the end wall 46 and the piston 47.

Figure 3:
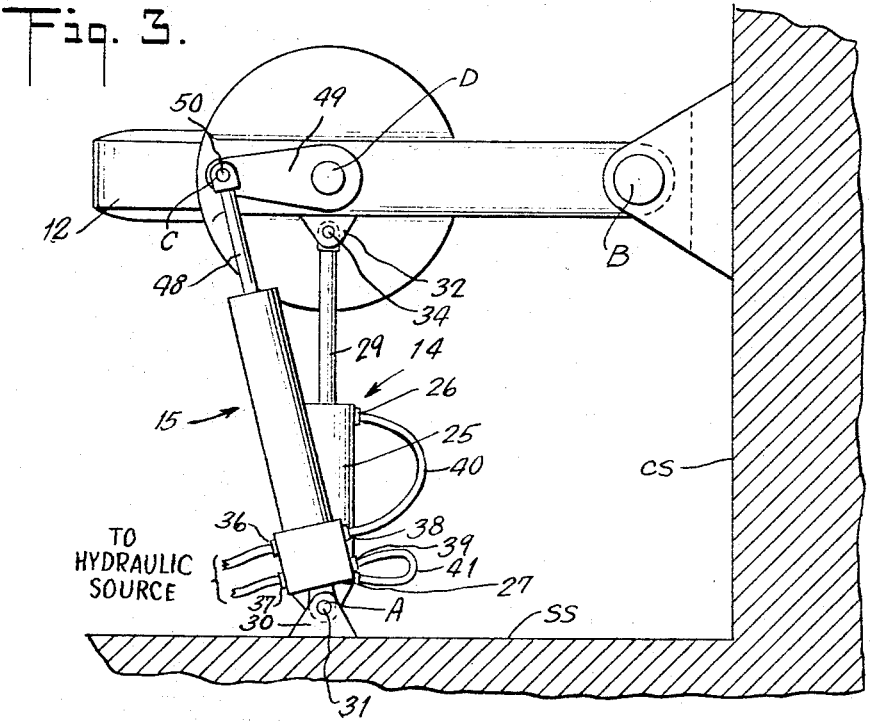
FIG. 3 is a sectional view taken along the line 3—3 on FIG. 2 illustrating the castering mechanism as seen from above.
Figure 4:
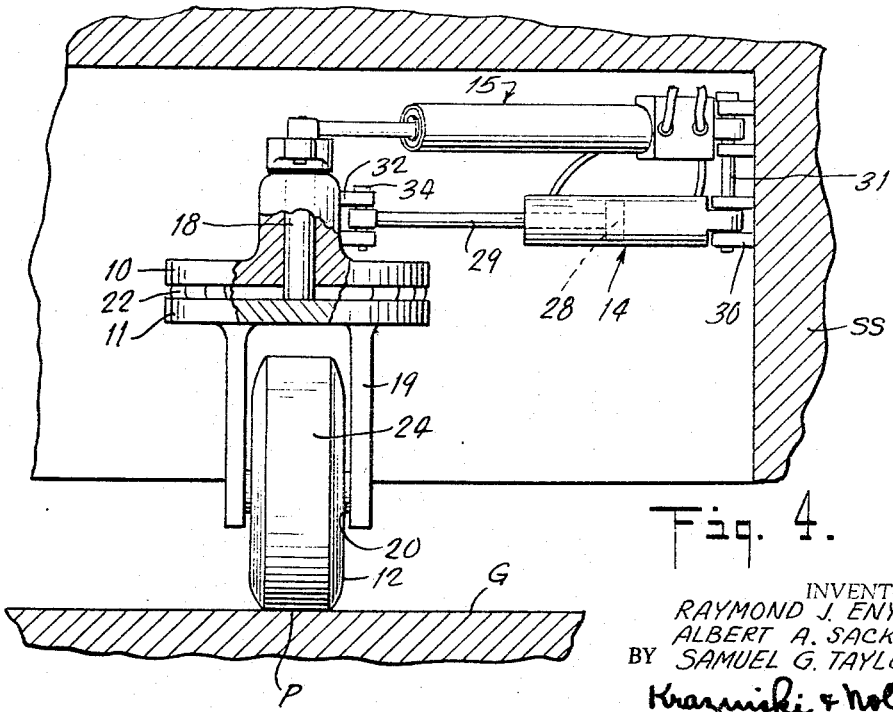
FIG. 4 is a sectional view taken along the line 4—4 on FIG. 2 illustrating the castering mechanism as seen looking from the left of FIG. 2.

The servo-valve 35, as shown in FIGS. 3 and 5, is in a neutral position and, when the caster wheel 12 and lever 49 are moved counter-clockwise, as seen in FIG. 3, the piston rod 48 is pushed into the cylinder 45 to cause fluid pressure to be exerted through port 38, conduit 40 and inlet port 26 upon motor means 14 to extend the piston rod 29 and, in turn, the plate 10 until the conditions of FIG. 6 are met. Conversely, when the caster wheel 12 and lever 49 are moved clockwise, as seen in FIG. 3, the piston rod 48 is pulled outwardly of the cylinder 45 to correspondingly retract piston rod 29 of the motor means 14.

Preferably, the end wall 46 has an internal stop 54 for limiting the right to left movement of the piston 47 to a predetermined distance.

In FIG. 6, a motion diagram is shown which illustrates the fixed points A and B and the relative positions of the moving points C and D as the wheel 12 casters upon change of directional movement of the vehicle V. Since the effective length CD of the lever 49 is the same as the offset distance AO of the tire center contact point P and since the pivot point C at the end of the lever 49 is in vertical alignment with the tire center contact point P, these two points are always in such alignment and are both indicated by the reference letter C in this diagram.

When the vehicle has moved from left to right, as viewed in FIG. 1, the wheel 12 is positioned as best shown in FIGS. 2 and 3. Should the vehicle now move from right to left, as viewed, the wheel eventually will assume the broken line position, shown in FIG. 2, after the shaft 21 has turned 180°. In so changing its position the tire to ground contact point P would normally tend to move through an arc of a relatively small radius equal to about the caster offset distance AO, whereby the vehicle would be subjected to considerable lateral thrust.

Such lateral thrust is prevented by maintaining the point C practically in line with the direction of movement of the vehicle V along the horizontal axis X—X (FIG. 6). This is accomplished by having the pivot point 50 (C) on the lever follow the point P, so that the servo-link 15 is actuated in a direction to control the motor means 14 to pull or push the upper plate 10 towards or away from the point A, a distance about equal to the distance the point P would depart from the line of travel X—X of the vehicle V. When the wheel 12 has castered halfway and the lever 49 has swung 90° into alignment with the vertical axis Y—Y, further castering of the wheel 12 causes the servo-link 15 to be actuated in an opposite direction to control the motor means 14 to return the axis of the shaft 21 and the upper plate 10 to its initial position D.

More specifically, as shown in the diagram (FIG. 6), if the wheel 12 casters in a counter-clockwise direction, as viewed in FIG. 3, the motor means 14 reciprocates and swings the axis D of the shaft 21 from point D to points $D_1$, $D_2$, $D_3$, and back to points $D_2$, $D_1$ and D, while at the same time the tire to ground contact point P moves from point C to points $C_1$, $C_2$, $C_3$, $C_4$, $C_5$ and $C_6$. Should the wheel caster in a clockwise direction, these points are assumed asymmetrically below the axis X—X. Movement of the vehicle from left to right causes these points to assume corresponding positions in the opposite direction.

Thus the wheel 12, as it casters, imparts motion to the lever 49 which transmits a signal to the servo-link 15 to operate the servo-valve 35 and causes the motor 14 to move the upper plate 10 in such a manner as to always maintain the center of the tire to ground contact point P along a line described by the arc of the servo-link pin 50 as it swings about the fixed point A. In the embodiment shown in FIGS. 1 to 4, the radius AD of this arc is about three times as great as the offset distance CD, whereby the point C substantially follows the axis X—X. By increasing this ratio, the point C follows the axis X—X even more closely.

While the effective length of the lever 49 and the offset distance CD are shown and described as being equal dimensions, it is apparent that they could be of different dimensions provided the servo-link 15 is adjusted to respond to operate the mechanism in the same manner as described before.

Referring again to FIG. 5, it is to be noted that the double acting spring 52 serves the function of allowing the caster to operate in a conventional manner in the event of hydraulic supply failure. In this event, of course, the motor means 14 cannot respond to actuation of the servo-valve 35 to position the upper caster plate 10. Thus the motion of the lever 49 with respect to the structure SS is absorbed by spring 52 and no damage is done to the servo-valve 36. Upon restoration of the hydraulic supply, the servo-valve 35 immediately signals motor means 14 to take up its proper position and servo-link 15 resumes its original length.

In FIGS. 7 to 9, a modified embodiment of the invention is shown which differs from the embodiment shown in FIGS. 1 to 4 in that the upper plate 10, instead of being mounted for pivotal movement about the point B, is mounted on a slide. This slide comprises a pair of channels 65, one of which is mounted on the vehicle structure CS and the other of which is supported by a crosswise extending member CM secured to and depending from the vehicle structure TS, a rectangular upper plate 10, and upper, lower and side rollers 66 on the upper plate 10 adapted to ride on upper and lower surfaces 67 and 68, respectively, and the web 69 of the channels 65.

The motor means 14 is connected to the point A and the upper plate 10, as described hereinbefore, except that it will reciprocate laterally without swinging, and the servo-link 35 and lever arrangement are identical to that described hereinbefore. An advantage of this modified embodiment is that the point C will be maintained exactly on the axis X—X along which the vehicle travels to thereby provide zero offset of the point C from the axis X—X and completely eliminate lateral thrust.

From the foregoing description it will be seen that the present invention provides a simple, practical, economical and reliable mechanism for preventing lateral side thrust while a wheel casters. This mechanism prevents damage to the vehicle and the vehicle or craft towed by it, and prevents excessive wear or damage to the pneumatic tire of the castering wheel.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a vehicle of the class described, castering mechanism comprising an upper caster plate, means for mounting said upper plate for lateral movement with respect to the vehicle, a lower caster plate, a vertical shaft secured to said lower plate and journalled in said upper plate for mounting said plates for rotary movement with respect to each other, a caster wheel having a horizontal axle, means on said lower plate for supporting said horizontal axle in a fixed offset position with respect to said vertical shaft, a lever secured to said vertical shaft having an effective length proportioned to the offset distance between said vertical shaft and said horizontal axle, motor means for effecting lateral movement of said upper plate, and means for controlling said motor means connected to said lever for sensing rotary movement of said vertical shaft and operating said motor means to maintain the center point of contact of said wheel with the ground in a substantially fixed lateral position with respect to the direction of travel of the vehicle.

2. Castering mechanism according to claim 1, wherein said motor means include a cylinder for containing hydraulic fluid and having an inlet and an outlet, a piston in said cylinder having a piston rod extending outwardly of said cylinder, said control means include a valve for controlling the flow of fluid into and out of said inlet and said outlet, and said cylinder and said piston rod are pivotally connected between said upper plate and a fixed point on the vehicle.

3. Castering mechanism according to claim 2, wherein said control means includes a servo-link for controlling said valve having a cylinder, piston and a piston rod connected to said last mentioned piston and extending outwardly of said last mentioned cylinder, and said servo-link piston rod and cylinder are pivotally connected between said lever and the same fixed point on the vehicle as said motor means.

4. Castering mechanism according to claim 3, wherein a double acting spring is connected to said servo-link piston.

5. Castering mechanism according to claim 1, wherein said means for mounting said upper plate include an arm secured to said upper plate at one end, and means for pivotally mounting said arm at its other end to a fixed point on the vehicle.

6. Castering mechanism according to claim 1, wherein said means for mounting said upper plate include a laterally extending slide on the vehicle, and a carriage movably mounted on said slide and supporting said upper plate.

7. Castering mechanism according to claim 1, wherein the effective length of said lever is equal to the offset distance of said vertical shaft and said wheel axis, and said lever and controlling means connection is in vertical alignment with the center point of contact of said wheel with the ground.

References Cited by the Examiner

UNITED STATES PATENTS

| 3,071,388 | 1/1963 | Ulinski | 280—79.1 |
| 3,071,389 | 1/1963 | Ulinski | 280—79.1 |
| 3,161,418 | 12/1964 | Brennan et al. | 280—81 |
| 3,212,793 | 10/1965 | Pietroroia | 180—79.2 X |

BENJAMIN HERSH, *Primary Examiner.*

J. A. PEKAR, *Assistant Examiner.*